July 22, 1952 G. W. HOLMES 2,603,930
MOWING AND SHRUB TRIMMING ATTACHMENT FOR TRACTORS
Filed Dec. 3, 1946 7 Sheets-Sheet 1

Inventor
Gray W. Holmes

By Clarence A. O'Brien
and Harvey B. Jacobson
Attorneys

July 22, 1952 G. W. HOLMES 2,603,930
MOWING AND SHRUB TRIMMING ATTACHMENT FOR TRACTORS
Filed Dec. 3, 1946 7 Sheets-Sheet 2

Inventor

Gray W. Holmes

By *Clarence A. O'Brien and Harvey B. Jacobson*
Attorneys

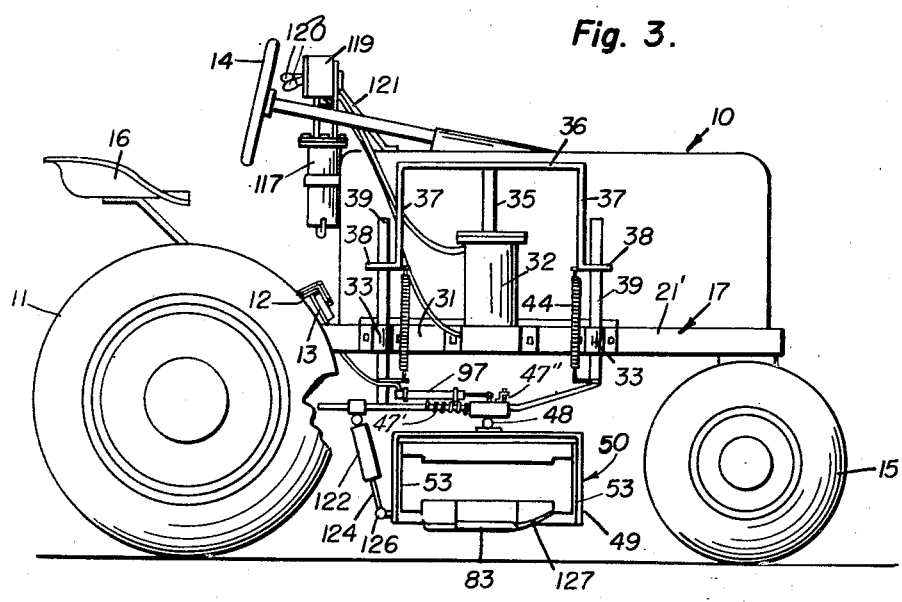

July 22, 1952 G. W. HOLMES 2,603,930
MOWING AND SHRUB TRIMMING ATTACHMENT FOR TRACTORS
Filed Dec. 3, 1946 7 Sheets-Sheet 4
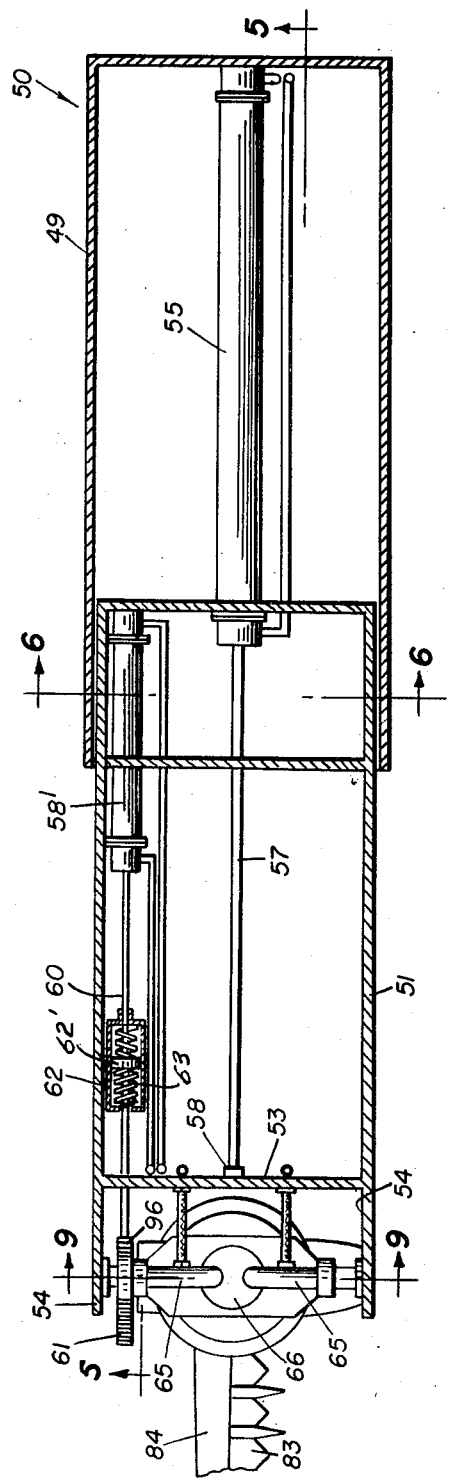
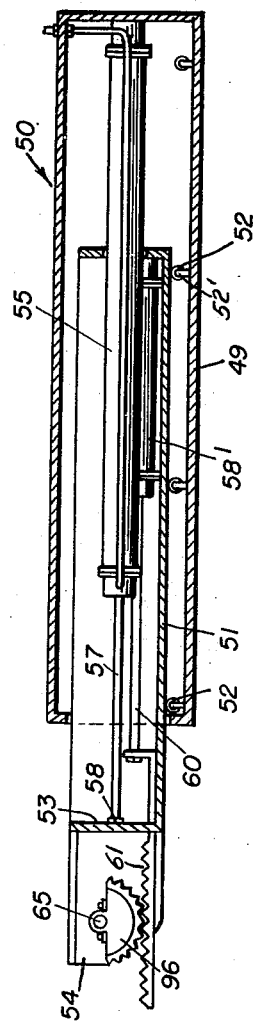
Inventor
Gray W. Holmes July 22, 1952  G. W. HOLMES  2,603,930
MOWING AND SHRUB TRIMMING ATTACHMENT FOR TRACTORS
Filed Dec. 3, 1946  7 Sheets-Sheet 5

Inventor
Gray W. Holmes
By Clarence A. O'Brien
and Harvey B. Jacobson
Attorneys

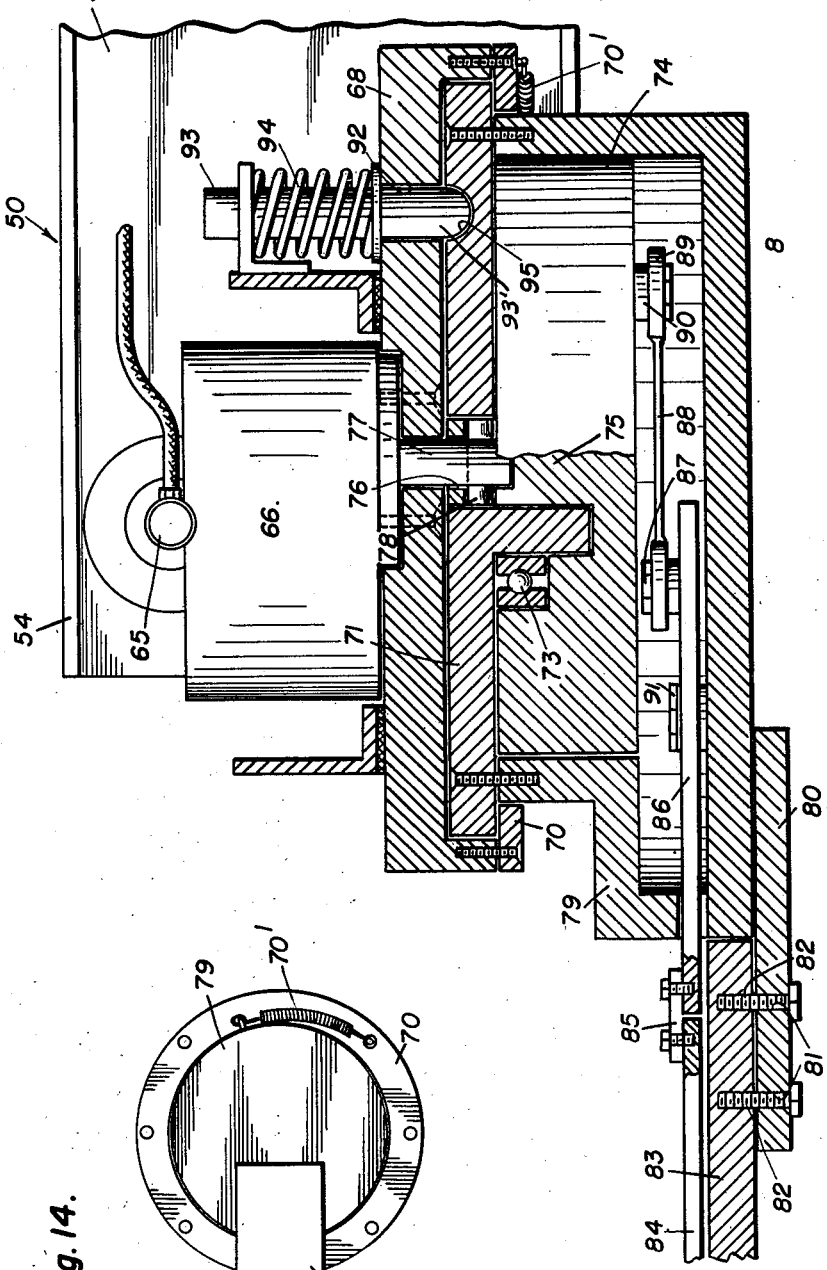
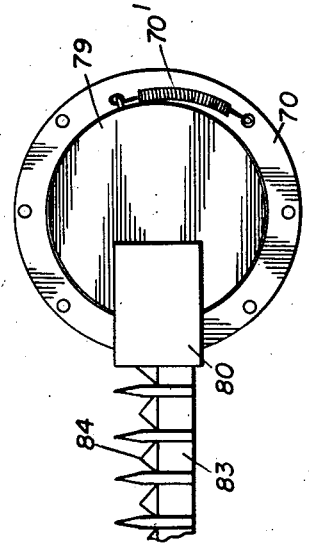

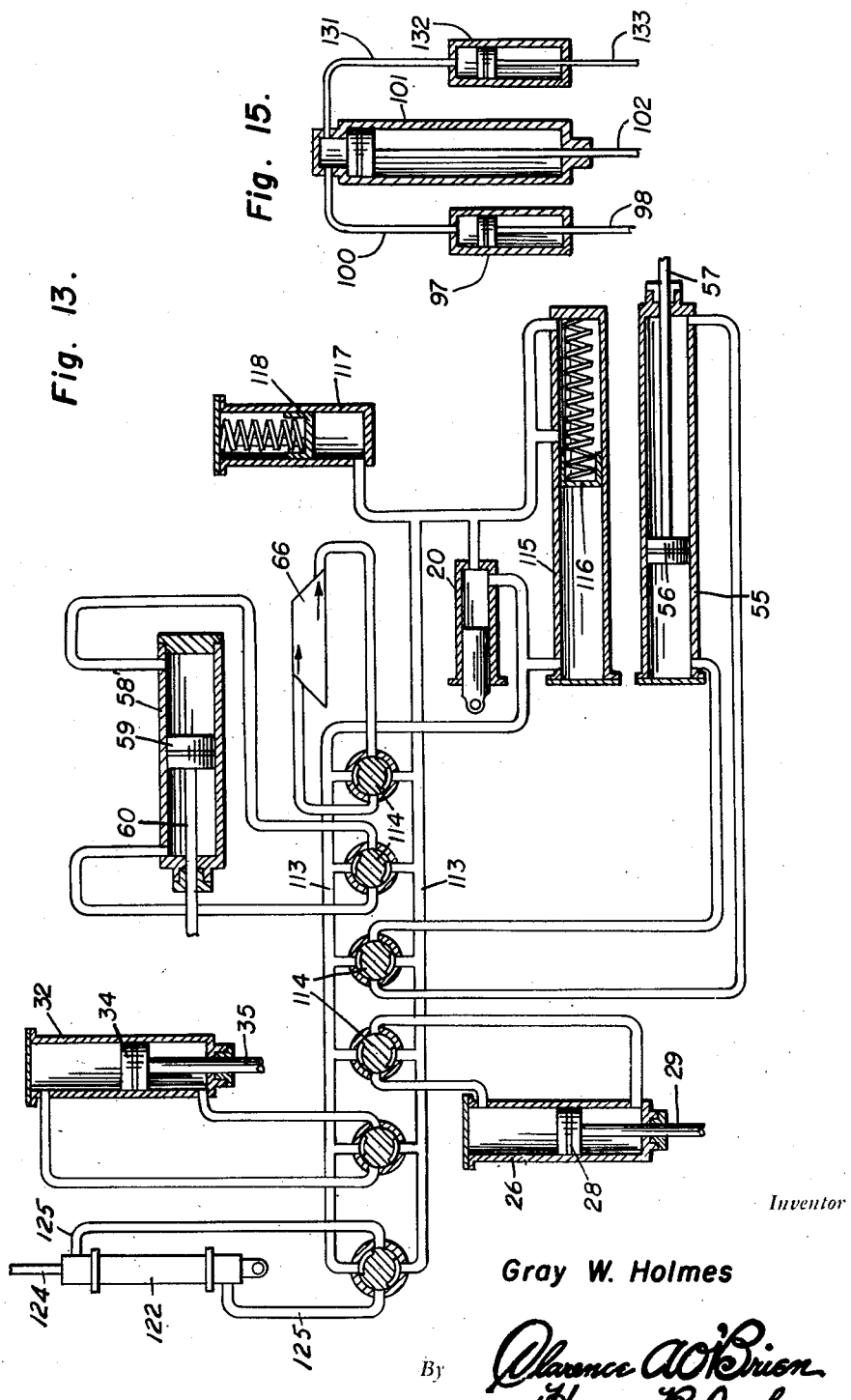

Patented July 22, 1952

2,603,930

UNITED STATES PATENT OFFICE 2,603,930

MOWING AND SHRUB TRIMMING ATTACHMENT FOR TRACTORS

Gray W. Holmes, Miller, Mo.

Application December 3, 1946, Serial No. 713,793

7 Claims. (Cl. 56—25)

This invention relates to a mower and shrub trimming attachment for a tractor and has for its primary object to trim grass, weeds, growing plants and the like.

Another object is to avoid injury to the sickle bar and sickle blade of the mowing attachment should an obstacle be encountered.

A further object is to facilitate the trimming of hedges and the like to the desired shape for ornamental purposes. The above and other objects may be attained by employing this invention which embodies among its features a mowing attachment adapted to be secured to and driven by a tractor which includes an extensible frame supported for rocking movement about an axis parallel to the longitudinal axis of the tractor, a sickle bar and sickle mounted at one end of the frame for pivotal movement about an axis parallel to the longitudinal axis of the tractor and a drive motor for the sickle mounted on the frame at its junction with the sickle bar and sickle.

Other features include means remote from the motor and the frame for regulating the various movements of the sickle bar, and the drive thereof, and means operable upon contact of the sickle bar and sickle with an obstacle automatically to interrupt the tractor drive.

Still other features include means to tilt the frame upon which the sickle bar is supported, and yieldingly to suspend it in such tilted position so that should the frame encounter an obstacle it may move, and means actuated by the movement of the frame automatically to interrupt the tractor drive.

In the drawings:

Figure 3 is a side view of Figure 1;

Figure 4 is a view partly in plan and partly in horizontal section, showing the supporting frame for the sickle bar and sickle and adjacent parts;

Figure 5 is a reduced sectional view taken substantially along the line 5—5 of Figure 4;

Figure 10 is a sectional view taken substantially along the line 10—10 of Figure 9;

Figure 12 is a schematic detail view illustrating the means automatically to interrupt the transmission of driving power to the drive wheels of the tractor;

Figure 13 is a diagrammatic view of the hydraulic control system,

Figure 14 is a bottom plan view of a fragment of the sickle bar and its mounting, and Figure 15 is a diagrammatic view of the automatic clutch disengaging equipment.

Figure 1:
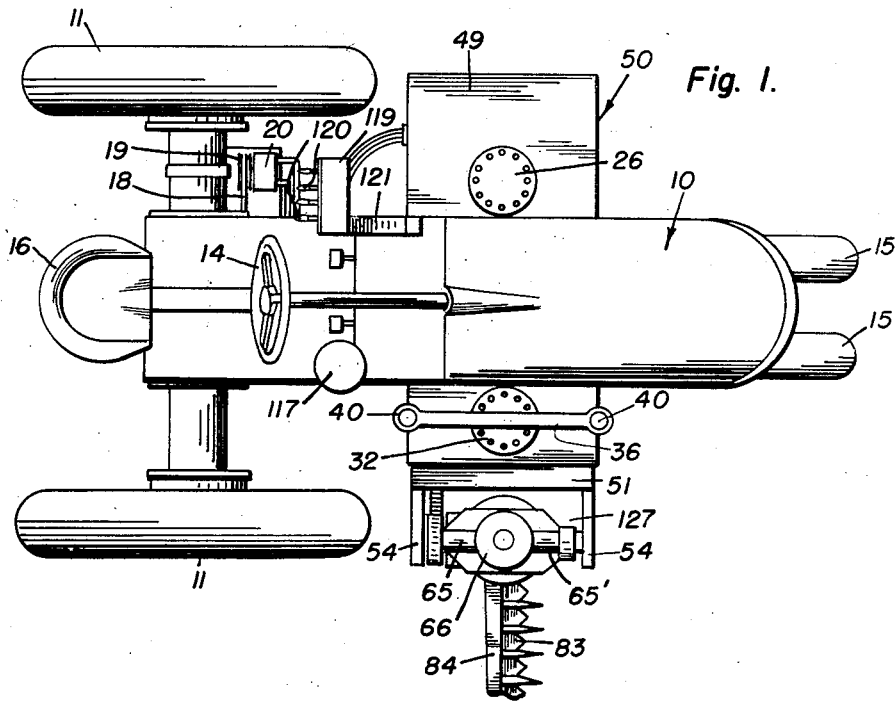
Figure 1 is a plan view of a tractor equipped with this improved attachment.
Figure 11:
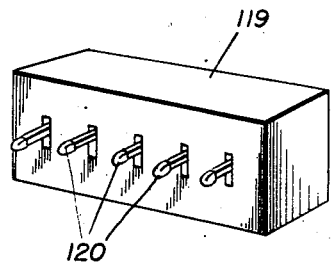
Figure 11 is a perspective view of the control box.
Figure 6:
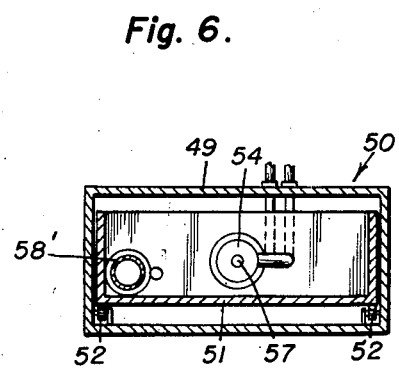
Figure 6 is a transverse sectional view taken substantially along the line 6—6 of Figure 4.
Figure 2:
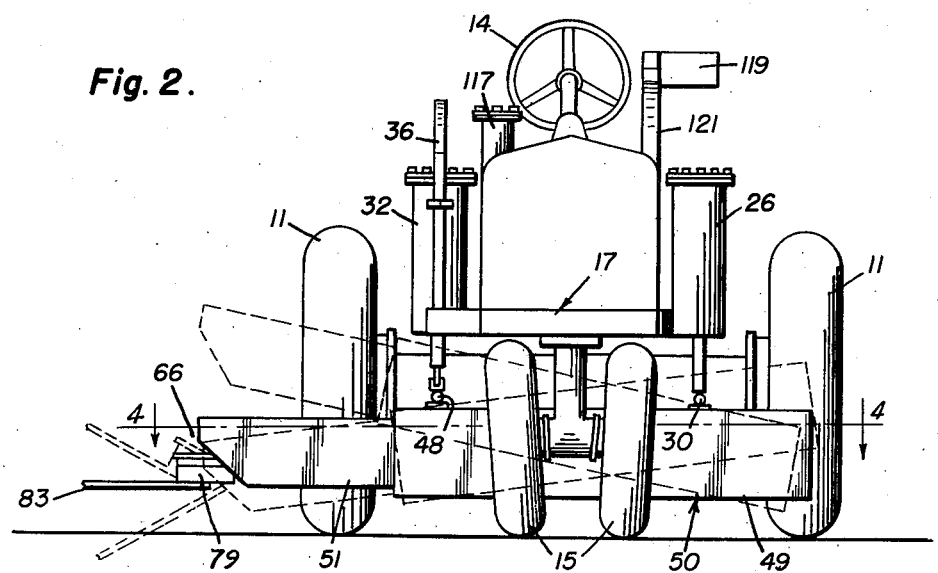
Figure 2 is a front view of Figure 1.

Referring to the drawings in detail a tractor designated generally 10 is equipped with the conventional traction wheels 11 connected through a conventional axle and transmission mechanism to the engine of the tractor. The drive is controlled by means of a conventional clutch pedal 12 (Figure 12) mounted at the upper end of a conventional clutch lever 13, and the tractor is equipped with a conventional steering wheel 14 by means of which the front ground wheels 15 are controlled. A conventional driver's seat 16 is supported on the tractor chassis designated generally 17 in the conventional manner, and connected by means of an endless belt 18 to the power take-off of the tractor is the drive pulley 19 of a fluid pump 20 carried on the chassis 17 in any suitable manner. The chassis 17 includes conventional side bars 21 and 21' extending along opposite sides of the tractor, and to which the moving attachment is connected in a manner to be more fully hereinafter described.

Figure 7:
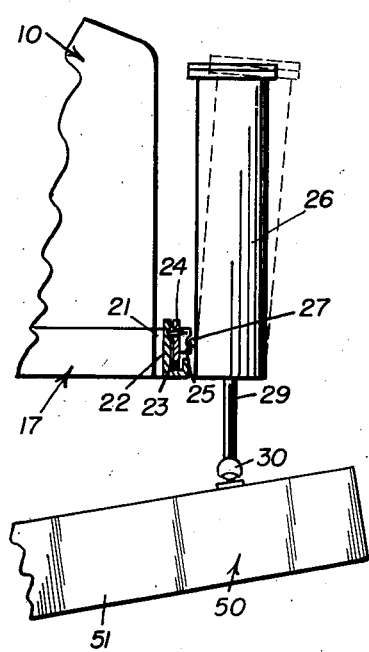
Figure 7 is an enlarged fragmentary detail view of the tractor showing the support for one end of the sickle bar and sickle supporting frame.
Figure 8:
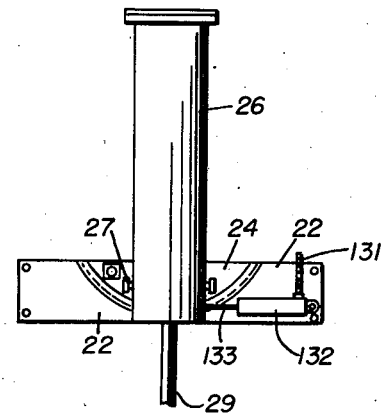
Figure 8 is a side view of Figure 7.

Secured to one of the side bars of the chassis 17 intermediate its ends is a plate 22 (Figure 7 and 8) formed intermediate its ends with an arcuate groove 23 forming a support for a rocking plate 24 carrying a laterally extending block 25 to which a cylinder 26 of a double-acting reciprocating hydraulic motor is pivotally supported as at 27. Working in the cylinder 26 is a piston 28 (Figure 13) to which a piston rod 29 is connected, and this rod projects through the lower end of the cylinder through a suitably packed joint and terminates at its lower end in a universal coupling 30 which in the present instance takes the form of a ball and socket coupling.

Mounted or otherwise attached to the side bar 21' of the tractor frame 17 opposite the bar 21 to which the plate 22 is attached is a suitable attaching plate 31 (Figures 3 and 12) supporting intermediate its ends the cylinder 32 of a double-acting reciprocating hydraulic motor, and adjacent opposite ends parallel guide sleeves 33.

The cylinder 32 is equipped with a piston 34 (Figure 13) to which is connected a piston rod 35 which operates through the upper end of the cylinder 32, and is connected at its upper end to a cross-bar 36 of an inverted U-shaped yoke which includes arms 37 which depend from the ends of cross bar 36 and have out-turned ears 38 each of which is provided with an opening which aligns with the bore of the respective guide 33. Slidably mounted in the guides 33 and extending through the openings in the ears 38 are the end guide and supporting arms or rods 39 of a U-shaped yoke provided at their upper ends with suitable heads 40 and connected at their lower ends by the intermediate cross-bar 41 of said yoke, the purpose of which will be more fully hereinafter explained. Attached to the lower ends of the arms 37 are brackets 42 to which the upper ends 43 of retractile coil springs 44 are attached. The lower ends of the springs 44 are connected as at 45 to brackets 46 carried by the guide bars 39 near their lower ends so that the guide bars 39, and the cross-bar 41 are yieldingly suspended on the lower ends of the arms 37.

Slidably mounted on the cross-bar 41 for movement perpendicularly to the movement of the piston rod 35, and along an axis substantially parallel to the longitudinal axis of the tractor 10 is a yoke 47 carrying at one end a universal coupling 48 which in the present instance takes the form of a ball and socket joint.

Connected to the universal couplings 30 and 48, and extending transversely of the longitudinal axis of the tractor 10 is the outer member 49 of a telescopic frame designated generally 50 which is provided with an inner member 51 slidably mounted on rollers 52 carried by brackets 52' secured within the member 49 as will be readily seen upon reference to Figure 5. Each telescopic member is substantially rectangular in plan as illustrated in Figure 4, and extending transversely of the inner member 51 near its outer end is a partition wall 53 forming a pair of spaced horizontally extending arms 54 in which the drive motor for the sickle and sickle bar is pivotally mounted as will be more fully hereinafter explained. Extending longitudinally of the member 49 intermediate its sides is the cylinder 55 of a double acting reciprocating hydraulic motor containing a piston 56 (Figure 13) to which a piston rod 57 is connected, and this piston rod extends through one end of the cylinder 55 and is connected at 58 to the partition wall 53, so that the member 51 may be moved inwardly and outwardly with relation to the member 49 in accordance with the desires of the user.

Carried by the member 51 is a cylinder 58' which extends parallel to the longitudinal axis of the frame or member 51, and working in the cylinder 58' is a piston 59 (Figure 13) to which is connected one end of a piston rod 60, the opposite end of which operates through one end of the cylinder 58'. The member 51 carries a cylinder 62. The rod 60 extends through an opening in the partition wall 53 and carries at its forward end a rack bar 61 the purpose of which will be more fully hereinafter described. Connected to the rod 60 is a plunger 62' which operates within the cylinder 62, and extending between opposite ends of the plunger 62' and the cylinder 62 are compression coil springs 63 in order to form a cushion for the absorption of shock when the sickle is moved to an elevated or lowered position by the piston 59.

Pivotally supported in suitable bearings 64 carried by the arms 54 near their outer ends are tubular shafts 65 which align axially with one another and extend toward the longitudinal axis of the member 51. A suitable rotary hydraulic motor 66 is supported at the inner ends of the shafts 65 and 65' and serves as the driving means for the sickle in a manner to be more fully hereinafter explained.

Figure 9:
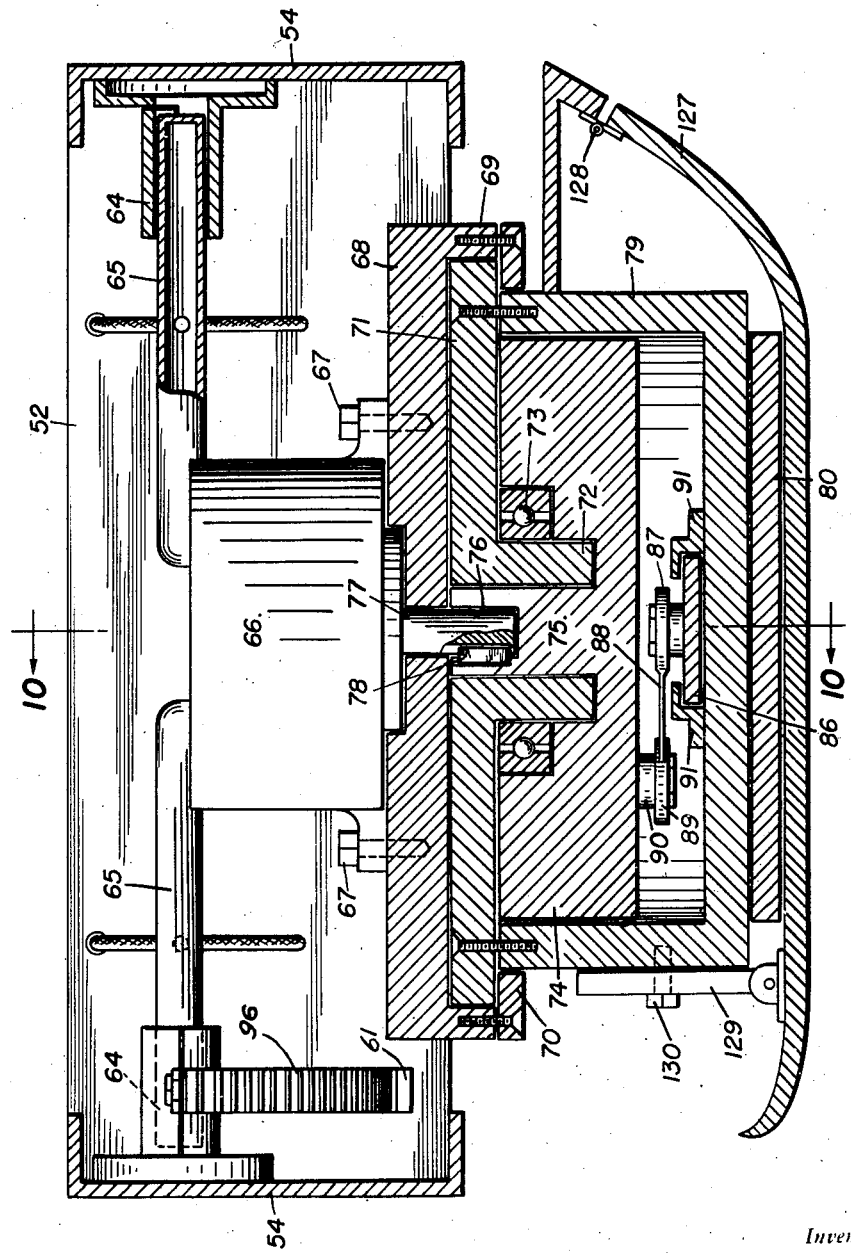
Figure 9 is an enlarged sectional view taken substantially along the line 9—9 of Figure 4.

Secured to the underside of the drive motor as by suitable cap screws 67 is a supporting and suspension plate 68 provided with an annular depending flange 69 supporting at its lower end an inwardly extending ring 70 forming the support for a top housing plate 71 provided with a central depending boss 72 to which the inner race of an anti-friction bearing 73 is attached. The outer race of the bearing 73 is pressed or otherwise rigidly fixed within a rotary head 74 carrying a central boss 75 the upper end of which is provided with a socket 76 into which the drive shaft 77 of motor 66 is received. Driving connection between the drive shaft 77 and the boss 75 is established through the medium of a suitable key 78, so that when the motor 66 is set into operation the head 74 will be rotated. Surrounding the head 74 and fixed to the plate 71 is a housing body 79 to the lower end of which is welded or otherwise secured a supporting plate 80 which is pierced as at 81 (Fig. 10) for the reception of cap screws 82 by means of which a sickle bar 83 may be coupled to the housing body 79. A sickle 84 is slidably mounted with relation to the sickle bar and is coupled as at 85 to a slide rod 86 which in turn is pivoted near its inner end as at 87 to a connecting rod 88. The opposite end 89 of the connecting rod is pivotally connected to a depending crank pin 90 carried by the rotary head 74, so that when the motor 66 is set into operation the sickle will be reciprocated. Suitable guides 91 (Figure 9) are arranged on opposite sides of the bar 86 in order to assure movement of the slide rod 86 only along one axis. A retractile coil spring 70' is anchored at one end to one of the screws by which the ring 70 is attached to the suspension plate 68, and at its other end to the housing 79 to yieldingly resist rotation of the housing and hold the sickle and sickle bar in proper cutting position.

Working through an opening 92 (Figure 10) in the plate 68 is a latch pin 93 yieldingly held downwardly by means of a compression coil spring 94, and the lower end of this pin is rounded as illustrated and adapted to engage in a recess 95 formed in the upper surface of the plate 71. The recess 95 is arranged in the upper surface of the plate 71 in such a position that the sickle bar 83 and sickle 84 will under normal circumstances be held in such a position as to extend parallel to the longitudinal axis of the telescopic frame 50, but when an obstacle is encountered the rounded end of the plunger 93 will ride out of the notch 95, and permit the sickle bar and sickle to swing about the axis of the shaft 77 and against the effort of the spring 70'. When the obstacle has been passed by the machine, the spring 70' will return the parts to their initial position.

Carried by the shaft 65 is a segmental gear 96 which meshes with the rack 61, so that when the rod 60 is moved, the motor 66 and the attendant mechanism including the sickle bar and sickle will be rotated about the longitudinal axes of the tubular shafts 65 and 65' to raise or lower the sickle bar and sickle.

Secured to one of the guide bars 39 (Figure 12)

is a cylinder 97 containing a piston (not shown) to which a piston rod 98 is connected. This piston rod works through a packed opening in one end of the cylinder 97 and is connected as at 99 to the yoke or carriage 47. A flexible tube 100 is connected to the cylinder 97 and its opposite end is connected to a cylinder 101 containing a piston (not shown) which is connected to a piston rod 102 at the outer end of which is pivoted to a lever 103 one end of which is pivoted as at 104 to the frame 17, while its opposite end is pivoted as at 105 to a plunger rod 106 which operates through a tubular guide 107 carried by the clutch operating lever 13 of the tractor. A latch 108 is pivoted as at 109 to the clutch pedal 12 and is provided with an angularly extending arm 110 which overlies the clutch pedal as will be readily understood upon reference to Figure 12. The end of the latch 108 opposite that which is pivoted to the clutch pedal carries a latch dog 111 which is adapted to engage in a notch 112 in the plunger 106 when no pressure is applied to the angular extension 110. It will thus be seen that when the mower or the telescopic frame 50 encounters an obstacle, the yoke or carriage 47 will move toward the rear of the tractor, thus forcing fluid contained within the cylinder 97 into the cylinder 101 to cause the piston rod 102 to operate the lever 103 and exert a pull on the plunger 106, thereby depressing the clutch pedal 110 to disengage the clutch and interrupt the driving power between the engine of the tractor 10 and the traction wheels 11.

In order to return the carriage 47 to its initial position a compression coil spring 47' is anchored at one end to the cross bar 41 and at its opposite end to the yoke or carriage 47 so that when the carriage moves under the influence of an obstacle engaging the sickle the spring will be compressed and after the pressure has been released, the energy stored in the spring will return the parts to their initial operating position. A pressure release latch 47'' serves in connection with a depression in the bar 41 to hold the parts in proper position. Also coupled with the cylinder 101 through the medium of a flexible tube 131 is a cylinder 132 (Figure 8) which is attached to the plate 22 adjacent the lower end of the cylinder 26. This cylinder 132 contains a piston (not shown) to which is connected one end of a piston rod 133, the opposite end of which is pivotally connected to the cylinder 26 near its lower end. It will thus be seen that when the cylinder 26 rocks with the rocking plate 24, the piston within the cylinder 132 will be moved. The piston rods 98 and 133 are normally extended to their fullest so that the pistons within the respective cylinders 97 and 132 lie at the ends of the cylinders opposite the tubes 100 and 131, while the piston within the cylinder 101 is wholly retracted. In this condition, the cylinders 97 and 132 and the tubes 100 and 131 are fluid filled, so that when either end of the frame 50 is engaged by an obstacle the piston in the cylinder 101 will be moved to disengage the clutch of the tractor.

The cylinders 26, 32 and 58' are connected to the pump 20 through suitable conduits and manifolds 113 and control valves 114, so that fluid pressure created by the pump may be utilized to operate the pistons within the various cylinders and also to control the operation of the drive motor 66. In order to preserve a uniform pressure within the system a suitable pressure chamber 115 is provided and carries a spring pressed plunger 116 which serves to preserve the entire system under pressure. An expansion chamber 117 is also provided, and like the chamber 115 is provided with a spring pressed plunger 118 which will yield in case the pressure in the system exceeds a predetermined value. The valves 114 are contained within a control box 119 and actuated by means of suitable control levers 120 which extend through the box which is preferably supported on a suitable bracket 121 mounted within convenient reach of the driver's seat 16 so that all movements of the sickle and sickle bar may readily be governed.

Tilting of the telescopic frame 50 about an axis extending through the universal couplings 30 and 48, whereby the angle of attack of the mower against the growing plants may be regulated, is governed by a cylinder 122 one end of which is pivoted as at 123 to the yoke or carriage 47, while the opposite end is provided with an opening through which piston rod 124 operates. The inner end of the piston rod is connected with a piston (not shown) and the cylinder is provided with ports to which flexible tubes 125 are connected to supply fluid to actuate the piston. The end of the piston rod 124 opposite that connected with the piston in the cylinder 122 is pivotally connected as at 126 to the frame 50, so that when fluid is admitted through the conduit 125 leading to the upper end of the cylinder the forward side of the frame 50 will be elevated whereas when fluid is admitted through the conduit entering the lower end of the cylinder, the forward side of the frame 50 will be lowered. A suitable shoe 127 is attached to the housing 79 by means of a suitable hinge connection 128, while the opposite end of the shoe is connected through the medium of a link 129 and set screw 130 to the opposite side of the housing as will be readily understood upon reference to Figure 9.

In use it will be understood that the operator of the tractor manipulates the levers 120 to control the positions of the telescopic frame 50 and the angle of the sickle bar and sickle. The tractor is then driven in the conventional manner and should an obstacle be encountered by either the end of the telescopic frame 50, or the sickle bar and sickle, the frame 50 will swing toward the rear of the tractor, thus forcing fluid contained within the cylinder 97 into the cylinder 101 to disengage the clutch of the tractor so as to stop its forward movement. The operator may then manipulate the proper levers to move the sickle bar and sickle into a position to disengage the obstacle, or it may be necessary to elevate the telescopic frame 50 and tilt it at a different angle in order to escape the obstacle, all of which may be accomplished from the driver's seat of the vehicle. Having manipulated the mechanism to avoid the obstacle, the parts may be reset to operative position and the mowing or trimming may be continued until again interrupted through engagement of the parts by another obstacle. The cycle may then be repeated and the entire operation carried on by the operator of the tractor without requiring that he leave his position on the machine.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. In a mowing attachment for tractors, a frame member, a rotary motor pivotally mounted in said frame member on a horizontal axis and having a depending drive shaft, a plate fixed to the underside of said motor, a housing suspended from said plate for turning movement about a vertical axis, a sickle bar fixed at one end to the housing, a rotary head connected in driving relation to the drive shaft of said motor and journalled in said housing, said head having a crank pin, a reciprocable sickle slidable on the sickle bar, a connecting rod operatively connecting said head to said sickle, power operated means connected between the motor and the frame to rotate the motor about its pivotal axis to raise and lower the sickle bar and sickle, and spring means connected between said plate and said housing to turn the housing in one direction to a predetermined position and to yieldingly resist turning of the housing in the other direction.

2. The construction defined in claim 1, together with a yielding latch means to latch the housing in said pre-determined position.

3. In a mower attachment for tractors, a double acting reciprocating hydraulic motor including a cylinder mounted in a substantially upright position at one side of the tractor for tilting movement laterally and longitudinally of said tractor and having a downwardly projecting piston rod, a second double acting reciprocating hydraulic motor including a cylinder rigidly mounted at the other side of the tractor and having an upwardly projecting piston rod, a telescopic frame disposed transversely of the tractor between the front and rear wheels thereof and including inner and outer frame members, a double acting reciprocating hydraulic motor arranged within and interposed between said frame members for projecting and retracting the inner frame member, a universal joint connection between the first named piston rod and one end of the outer frame member, an inverted U-shaped yoke centrally fixed to the upper end of the second named piston rod, vertical guides fixed to said other side of the tractor at the front and rear of the second named cylinder, a second U-shaped yoke having end arms slidable in said guides and slidably connected to the ends of the first named yoke, a third yoke slidable on the intermediate portion of the second named yoke longitudinally of the tractor, yieldable means to resist rearward movement of the third yoke, a universal joint connection between the third yoke and the other end of said outer frame member, tension springs yieldingly supporting the second named yoke from the first named yoke, a motor driven reciprocating sickle type cutting mechanism mounted on the outer end of said inner frame member, and control means for each of said motors, said means operable from the driver's seat of the tractor for independently controlling the operation of the motors.

4. The construction defined in claim 3, together with a rod means releasable by the foot for connecting said rod to the clutch pedal of the tractor, a reciprocating hydraulic motor operatively connected to said rod, and hydraulic pumps operatively connected to the third yoke and to the first named cylinder for actuating the last named motor to release the tractor clutch upon rearward displacement of the frame.

5. The construction defined in claim 3, together with a double acting reciprocating hydraulic motor operatively connected to the frame for laterally tilting the latter about the universal joint connections to vary the angle of attack of the cutting mechanism.

6. In a mowing attachment for a tractor, a frame mounted on said tractor, a rotary motor pivotally mounted in said frame member on an axis substantially parallel to the longitudinal axis of the tractor, a mounting plate rigidly secured to the underside of said motor, said plate having an axial opening therein, a drive shaft on said motor extending through said opening, a housing journaled on said plate, a sickle bar, said sickle bar having one end fixed on said housing, a rotary head journaled in said housing, a driving connection between said drive shaft and said head, a crank pin on said head, a sickle slidably mounted on said sickle bar, a connecting rod pivotally connected to said sickle and to said crank pin, resilient means yieldingly biasing said housing into a predetermined position with regard to said mounting plate.

7. In a mowing attachment for a tractor, a frame mounted on said tractor, a rotary motor pivotally mounted in said frame member on an axis substantially parallel to the longitudinal axis of the tractor, a mounting plate rigidly secured to the underside of said motor, said plate having an axial opening therein, a drive shaft on said motor extending through said opening, a housing journaled on said plate, a sickle bar, said sickle bar having one end fixed on said housing, a rotary head journaled in said housing, a driving connection between said drive shaft and said head, a crank pin on said head, a sickle slidably mounted on said sickle bar, a connecting rod pivotally connected to said sickle and to said crank pin, resilient means yieldingly biasing said housing into a predetermined position with regard to said mounting plate, said plate having an opening therein, a recess in said housing registering with said opening, a latch pin extending through and having a rounded end engaging said recess, and resilient means urging said pin into contact with said recess.

GRAY W. HOLMES.

REFERENCES CITED

The following references are of record in the file of this patent:

UNITED STATES PATENTS

| Number | Name | Date |
|---|---|---|
| 1,911,516 | Landing | May 30, 1933 |
| 1,939,851 | Horste | Dec. 19, 1933 |
| 1,953,394 | Clapper | Apr. 3, 1934 |
| 2,065,901 | Leavitt | Dec. 29, 1936 |
| 2,375,912 | Gifford | May 15, 1945 |